United States Patent
Yang et al.

(10) Patent No.: US 10,116,435 B2
(45) Date of Patent: Oct. 30, 2018

(54) CONTROL CIRCUIT AND CONTROL METHOD OF COMMUNICATION DEVICE

(71) Applicant: MStar Semiconductor, Inc., Hsinchu Hsien (TW)

(72) Inventors: Shih Jyun Yang, Hsinchu Hsien (TW); Ji-Fu Chang, Hsinchu Hsien (TW); Kuo-Kuang Lo, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 32 days.

(21) Appl. No.: 15/289,294

(22) Filed: Oct. 10, 2016

(65) Prior Publication Data
US 2017/0310460 A1 Oct. 26, 2017

(30) Foreign Application Priority Data
Apr. 25, 2016 (TW) .............................. 105112780 A

(51) Int. Cl.
*H04L 7/08* (2006.01)
*H04L 7/00* (2006.01)

(52) U.S. Cl.
CPC .............. *H04L 7/08* (2013.01); *H04L 7/0037* (2013.01)

(58) Field of Classification Search
CPC ................................ H04L 7/08; H04L 7/0037
See application file for complete search history.

(56) References Cited

U.S. PATENT DOCUMENTS

| 7,230,460 B1* | 6/2007 | Wan .......................... H03L 7/07 327/156 |
|---|---|---|
| 2004/0247045 A1* | 12/2004 | Marbot ................... H03L 7/091 375/316 |
| 2006/0076993 A1* | 4/2006 | Teo .......................... H03K 5/13 327/165 |
| 2007/0174727 A1* | 7/2007 | Liao ....................... H03L 7/1976 714/43 |
| 2009/0116603 A1* | 5/2009 | Wang ....................... H03L 7/00 375/376 |
| 2010/0054387 A1* | 3/2010 | Wu ...................... G06F 13/4291 375/376 |
| 2010/0197228 A1* | 8/2010 | Dong .................... H04J 3/0644 455/41.2 |
| 2013/0103969 A1* | 4/2013 | Wang ....................... G06F 1/12 713/502 |
| 2016/0147703 A1* | 5/2016 | Park ....................... G06F 13/14 710/106 |

* cited by examiner

*Primary Examiner* — Min Jung
(74) *Attorney, Agent, or Firm* — Edell, Shapiro & Finnan, LLC

(57) ABSTRACT

A control circuit of a communication device includes: a periodic packet detection circuit, detecting a periodic packet of a data signal to generate a packet indication signal corresponding to the periodic packet; a frequency synthesis circuit, coupled to the periodic packet detection circuit, generating a working clock according to a reference clock; and a setting value generating circuit, coupled to the periodic packet detection circuit, generating a setting value according to a relationship between the frequencies of the working clock and the packet indication signal. The frequency synthesis circuit further adjusts the working clock according to the setting value to cause the frequency of the working clock to substantially be a predetermined multiple of the frequency of the packet indication signal.

16 Claims, 6 Drawing Sheets

CONTROL CIRCUIT AND CONTROL METHOD OF COMMUNICATION DEVICE

This application claims the benefit of Taiwan application Serial No. 105112780, filed Apr. 25, 2016, the subject matter of which is incorporated herein by reference.

BACKGROUND OF THE INVENTION

Field of the Invention

The invention relates in general to a communication device, and more particularly to a control circuit and a control method of a data receiver of a communication device.

Description of the Related Art

Most communication devices demand certain precisions on clocks to ensure that data can be correctly obtained from data signals. Taking Universal Serial Bus (USB) for example, the precision of the frequency of a working clock needs to be within ±500 ppm. On the other hand, in response to the trend of being compact and light of electronic products, many communication devices have adopted in-chip oscillation circuits rather than crystal oscillators that occupy too much space. However, an oscillation circuit is incapable of generating sufficiently precise clocks, and such issue puts communication devices needing precise clocks to a big test. Therefore, there is a need for a control circuit and a control method applied to a crystal-less oscillator communication device, so as to guarantee stable operations of the communication device given a reduced volume.

SUMMARY OF THE INVENTION

It is an objective of the present invention to provide a control circuit and a control method of a communication device to generate high-precision clocks.

The present invention discloses a control circuit of a communication device. The control circuit includes: a periodic packet detection circuit, detecting a periodic packet of a data signal to generate a packet indication signal corresponding to the periodic packet; a frequency synthesis circuit, coupled to the periodic packet detection circuit, generating a working clock according to a reference clock; and a setting value generating circuit, coupled to the periodic packet detection circuit and the frequency synthesis circuit, generating a setting value according to a relationship between frequencies of the working clock and the packet indication signal. The frequency synthesis circuit further adjusts the working clock according to the setting value, such that the frequency of the working clock is substantially a predetermined multiple of the frequency of the packet indication signal.

The present invention further discloses a control method of a communication device. The control method includes: detecting a periodic packet of a data signal to generate a packet indication signal indicating the periodic packet; generating a working clock according to a reference clock; and adjusting the working clock according to a relationship between frequencies of the working clock and the packet indication signal, such that the frequency of the working clock is substantially a predetermined multiple of the frequency of the packet indication signal.

The control circuit and the control method of a communication device of the present invention are capable of generating a high-precision clock at a local end according to the cycle of predetermined packet transmitted from a transmitter. As opposed to the prior art, the control circuit and the control method of the present invention are capable of generating a precise clock without involving crystal oscillators.

The above and other aspects of the invention will become better understood with regard to the following detailed description of the preferred but non-limiting embodiments. The following description is made with reference to the accompanying drawings.

DETAILED DESCRIPTION OF THE INVENTION

The disclosure of the application includes a control circuit and a control method of a communication device capable of generating high-precision clocks. In possible implementation, one person skilled the art can realize the present invention by selecting equivalent elements or steps based on the disclosure of the application. That is, the implementation of the present invention is not limited to the non-limiting embodiments hereunder.

Figure 1:
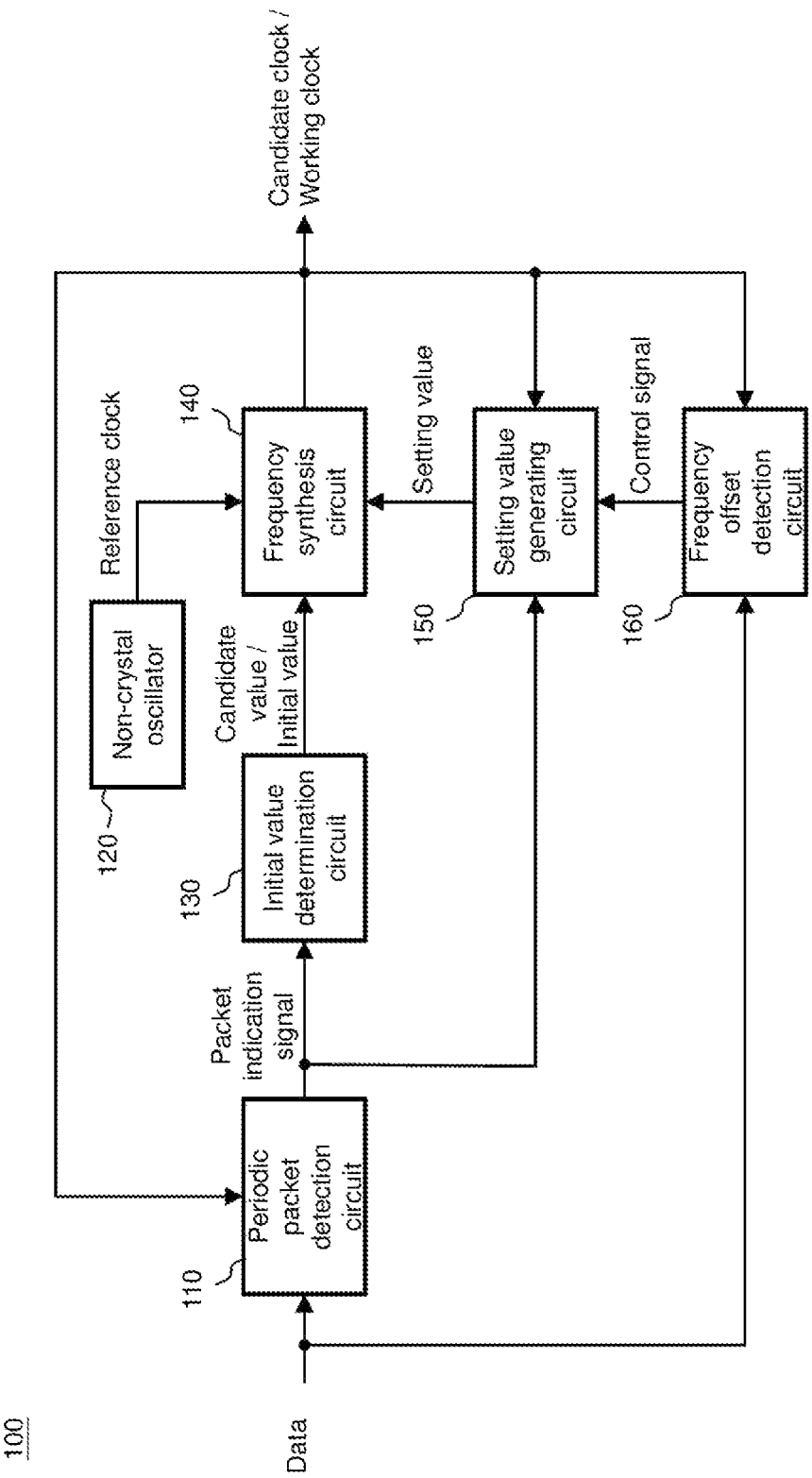
FIG. 1 is a block diagram of a control circuit of a communication device according to an embodiment of the present invention.
Figure 2:
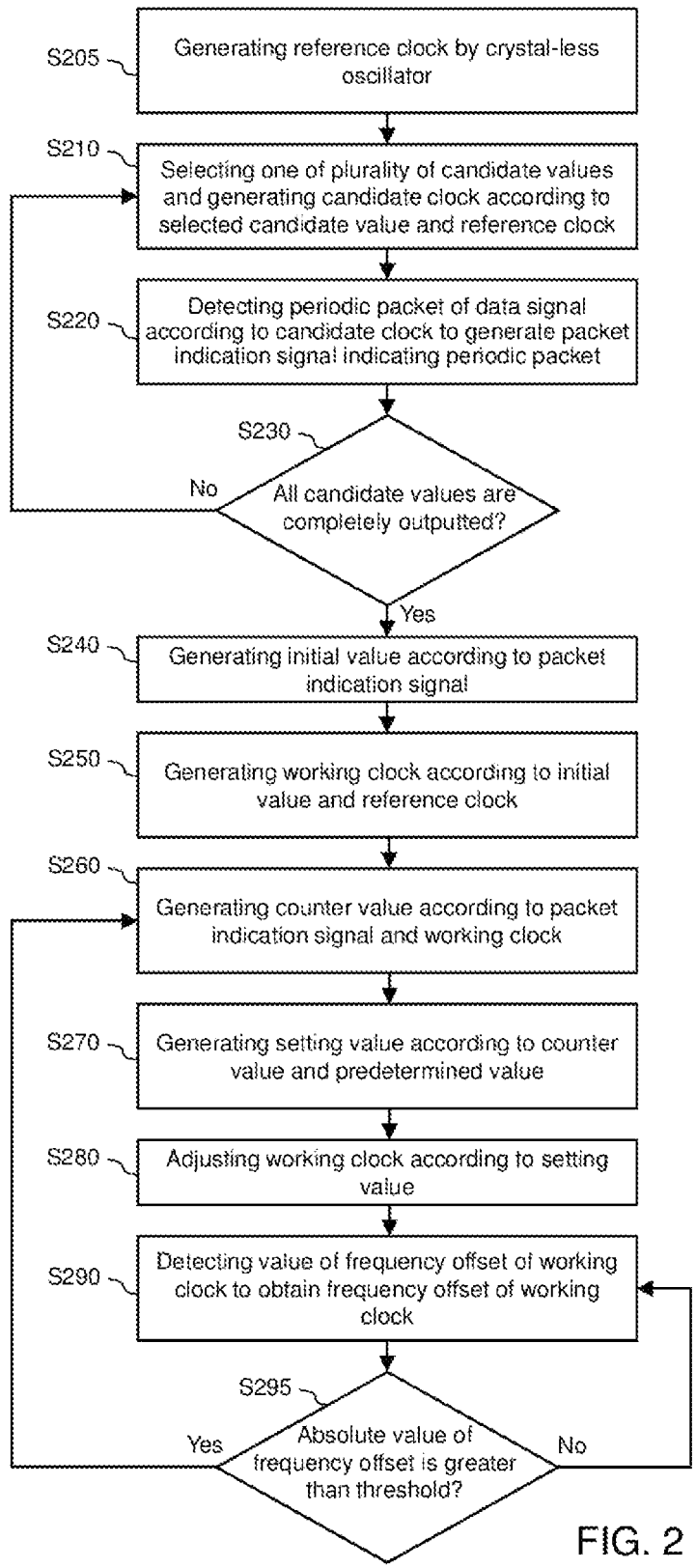
FIG. 2 is a flowchart of a control method of a communication device according to an embodiment of the present invention.

In some communication devices, data signals between a transmitter and a receiver carry periodic packets, which may be used as the basis of frequency reference. FIG. 1 shows a block diagram of a control circuit of a communication device according to an embodiment of the present invention. The control circuit 100 includes a periodic packet detection circuit 110, a crystal-less oscillator 120, an initial value determination circuit 130, a frequency synthesis circuit 140, a setting value generating circuit 150 and a frequency offset detection circuit 160. Details of how the present invention obtains precise working clocks without using crystal oscillators are given with reference to FIG. 2 showing a flowchart of a control method of a communication device according to an embodiment of the present invention.

First, the crystal-less oscillator 120 (e.g., a ring oscillator or an LC oscillator) oscillates to generate a reference clock (step S205), and the frequency synthesis circuit 140 then generates a working clock that the control circuit 100 requires according to the reference clock generated by the crystal-less oscillator 120. Before the working clock is generated, the frequency synthesis circuit 140 first generates a candidate clock according to a candidate value that the initial value determination circuit 130 generates and the reference clock (step S210), and the periodic packet detection circuit 110 detects a periodic packet of the data signal Data to generate a packet indication signal indicating the periodic packet (step S220). The frequency synthesis circuit 140 may be implemented by a common phase-locked loop (PLL) and a frequency dividing circuit. The frequency dividing circuit generates a divisor according to an input value (i.e., the candidate value). The frequency of an output clock of the frequency synthesis circuit 140 (the candidate clock or the working clock) approximates a product of the frequency of the reference clock and the divisor.

A communication device has detailed definitions on a packet format or contents of the periodic packet, and so the periodic packet detection circuit 110 may compare the data signal Data with a predetermined packet format or contents according to the communication system to which the control circuit 100 is applied to identify the periodic packet. When the periodic packet is identified, the periodic packet detection circuit 110 issues a pulse to indicate that one periodic packet has been received. As the periodic packet periodically occurs in the data signal Data, the packet indication signal is a periodic pulse signal and has a frequency equal to the frequency at which the periodic packet occurs.

Figure 3:
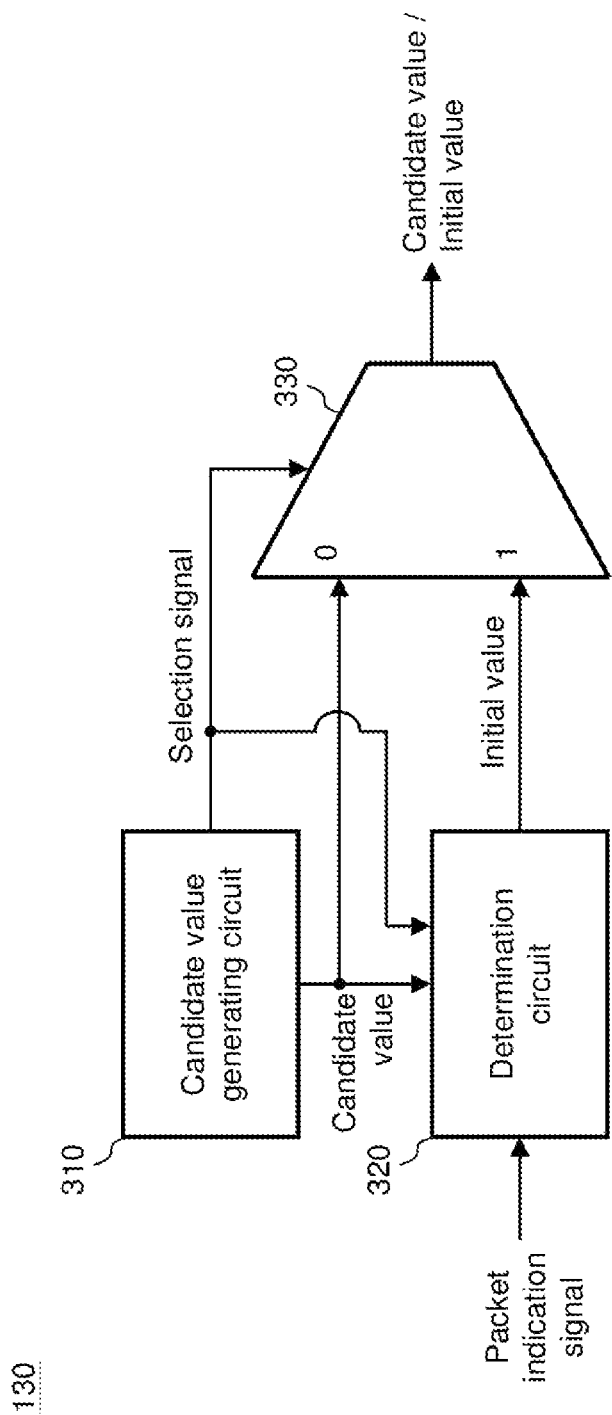
FIG. 3 is a block diagram of an initial value determination circuit according to an embodiment of the present invention.

FIG. 3 shows a block diagram of the initial value determination circuit 130 according to an embodiment. A candidate value generating circuit 310 stores a plurality of candidate values, e.g., 10, and sequentially outputs the 10 candidate values to a determination circuit 320 as well as to the frequency synthesis circuit 140 through a multiplexer 330. Before the 10 candidate values are completely outputted, the candidate value generating circuit 310 controls the multiplexer 330 to select and output the candidate value (the selection signal at this point is 0). The frequency synthesis circuit 140 generates the candidate clock according to the reference clock and the candidate values, and the periodic packet detection circuit 110 then generates the packet indication signal according to the candidate clock. The determination circuit 320 determines whether the periodic packet can be detected by using the candidate clock currently generated according to the packet indication signal (a pulse occurs in the packet indication signal if the periodic packet is detected, otherwise no pulse occurs). When the periodic packet is detected, the determination circuit 320 records the candidate value. The candidate value generating circuit 310 continues outputting the candidate value and the periodic packet detection circuit 110 continues detecting the periodic packet according to the candidate clock corresponding to the candidate value (steps S210 to S230 are repeated) until all of the candidate values are completely outputted (the determination result of step S230 is affirmative). When all of the candidate values are completely outputted (the selection signal at this point is 1), the determination circuit 320 determines an initial value from the recorded candidate values; that is, the initial value is in fact determined by the determination circuit 320 according to the packet indication signal. At this point, the selection signal of the candidate value generating circuit 310 controls the multiplexer 320 to select the initial value as the output of the initial value determination circuit 130 (i.e., the input value of the frequency dividing circuit of the frequency synthesis circuit 140) (step S240), and the frequency synthesis circuit 140 then generates the working clock according to the initial value and the reference clock (step S250). The periodic packet in the data signal Data can be detected using the working clock at this point, which means the control circuit 100 has obtained a working clock that can be preliminarily used for sampling the data signal Data when step S250 ends. However, the precision of the working clock at this point may not be optimal, and the working clock needs to be further fine-tuned.

It should be noted that, in one embodiment, from a plurality of candidate values by which the periodic packet can be detected according to the packet indication signal, the determination circuit 320 may select one candidate value as the initial value. In continuation of the above example, assume that the 10 candidate values sequentially correspond to the candidate clocks in an increasing order, and the periodic packet may be detected according to the candidate clocks corresponding to the $5^{th}$, $6^{th}$ and $7^{th}$ candidate values. Thus, the determination circuit 320 regards the median value (i.e., the $6^{th}$ candidate value) of the three candidate values as the initial value, so as to obtain a preferred initial working clock.

Figure 4:
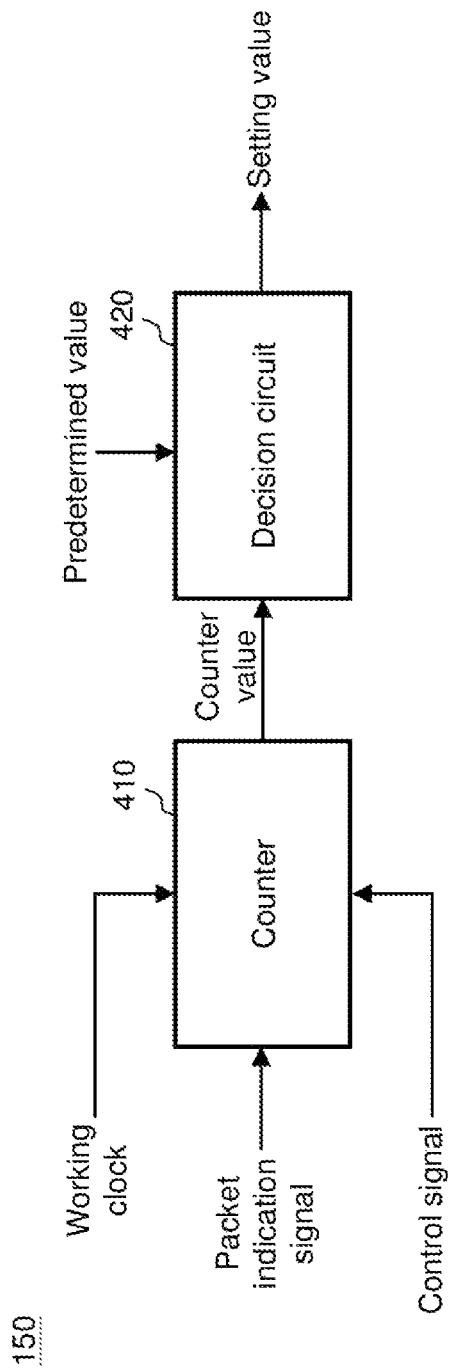
FIG. 4 is a block diagram of a setting value generating circuit according to an embodiment of the present invention.

After the working clock is generated, the setting value generating circuit 150 generates the setting value according to the packet indication signal and the working clock. The frequency synthesis circuit 140 then adjusts the working clock according to the setting value (steps S260 to S280). FIG. 4 shows a block diagram of the setting value generating circuit 150 according to an embodiment. The setting value generating circuit 150 includes a counter 410 and a decision circuit 420. The counter 410 operates according to a control signal. When the control signal causes the counter 410 to be enabled, the counter 410 starts counting. The counter 410 is initially set at the enabled state. Further, the counter 410 generates a counter value according to the working clock and the packet indication signal (step S260). More specifically, the counter 410 increases the counter value according to a rising edge (or a falling edge) of the working clock, and resets the counter value to zero according to the packet indication signal. Therefore, the counter value represents a ratio between the cycles of the packet indication signal and the working clock. As the frequency of the packet indication signal is quite precise, when the decision circuit 420 compares the counter value with a predetermined value, it may be learned whether the frequency of the working clock is close to an ideal frequency (associated with the predetermined value) and the setting value of the working clock may be accordingly adjusted (step S270). The counter 410 enters a disabled state after it generates the counter value, and is switched between the enabled state and the disabled state according to the control signal. When the counter value is smaller than the predetermined value, it means that the frequency of the working clock is lower than the ideal frequency, and the decision circuit 420 at this point increases the setting value to cause the frequency synthesis circuit 140 to generate a working clock having a higher frequency. Conversely, when the counter value is greater than the predetermined value, it means that the frequency of the working clock is higher than the ideal frequency, and the decision circuit 420 at this point decreases the setting value to cause the frequency synthesis circuit 140 to generate a working clock having a lower frequency (step S280).

Figure 5:
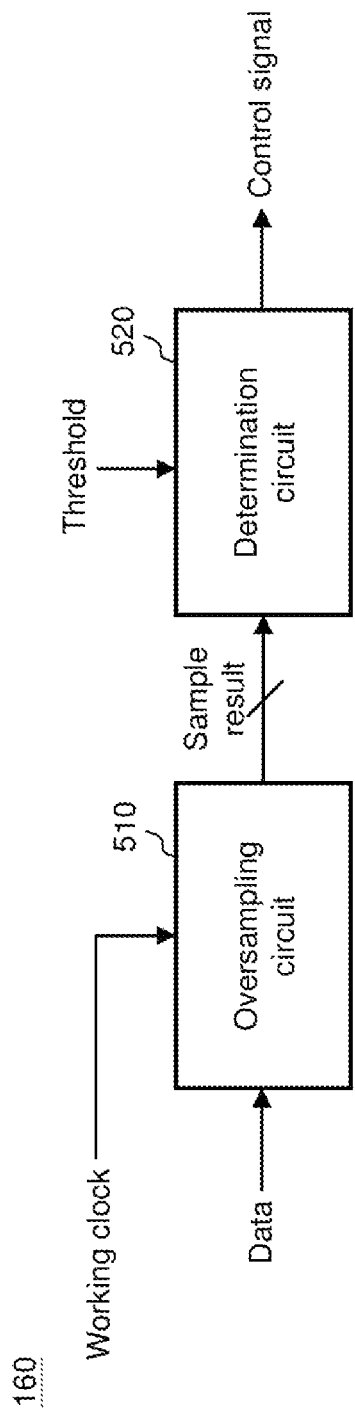
FIG. 5 is a block diagram of a frequency offset detection circuit according to an embodiment of the present invention.

Steps S260 to S280 may be regarded as fine-tuning steps of the working clock. Because the packet indication signal has certain precision and the working clock is fine-tuned according to the packet indication signal, the adjusted working clock has the precision in the same scale as the packet indication signal, and the fine-tuned working clock may be used to sample the data signal Data. However, in practice, after the control circuit 100 has worked for an extended period of time, the frequency of the working clock may be shifted as a result of changes in the ambient temperature. Thus, the control circuit 100 may further include a frequency offset detection circuit 160 that detects whether the working clock is shifted. The frequency offset detection circuit 160 samples the data signal Data according to the working clock to obtain the frequency offset of the working clock (step S290), and compares the frequency offset with a threshold (step S295) to determine whether to control the setting value generating circuit 150 to update the setting value. More specifically, as shown in FIG. 5, the frequency offset detection circuit 160 includes an oversampling circuit 510 and a determination circuit 520. The oversampling circuit 510 delays the working clock according to multiple different phases to generate multiple sample clocks, and samples the data signal Data according to the sample clocks to obtain multiple sample values. The determination circuit 520 may then obtain a value of the frequency offset according to the number of consecutive same sample values.

Figure 6:
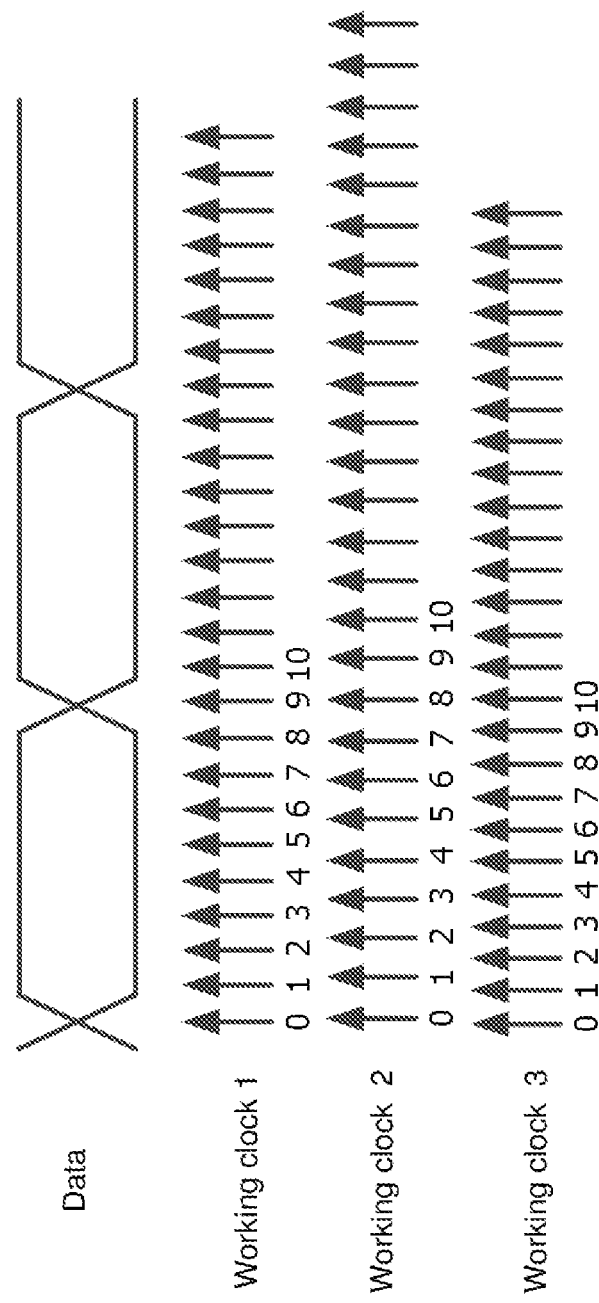
FIG. 6 is a schematic diagram of data signals oversampled by working clocks of different frequencies.

For example, as shown in FIG. 6, assume that the frequency offset detection circuit 160 generates 10 sampling clocks according to the working clock (with a phase difference between two adjacent sample clocks being $2\pi/10$). Thus, in an ideal situation (where there is no frequency offset in the working clock, as shown by the working clock 1), a single datum of the data signal Data is oversampled with the sampling clocks and expected to correspond to 9 consecutive same sample results. However, if the frequency of the working clock is increased (as shown by the working clock 3), the datum of the data signal Data is expected to correspond to more than 9 consecutive same sample results (e.g., the 10 same sample results obtained from sampling the datum according to the working clock 3 in FIG. 6). Conversely, if the frequency of the working clock 3 is lowered (as shown by the working clock 2), the datum of the data signal Data is expected to correspond to less than 9 consecutive sample results (e.g., the 8 same sample results obtained from sampling the datum according to the working clock 2 in FIG. 6). Based on the above principle, the determination circuit 250 may obtain the value of the frequency offset of the working clock according to the sample results. For example, 10 and 8 consecutive same sample results respectively represent that the frequency of the working clock is slightly shifted by 11% and −11%, 11 and 7 consecutive sample results represents that the frequency of the working clock is respectively shifted by 22% and −22%, and so forth. According to the value of the frequency offset (i.e., the above percentage, or an equivalence to the number of consecutive same sample results), the determination circuit 520 then determines whether to control the setting value generating circuit 150 by the control signal to update the setting value (i.e., controlling the counter 410 to be enabled and to re-count). For example, the threshold is set to 10%. When an absolute value of the frequency offset is greater than or equal to 10%, the determination circuit 420 causes the counter 410 to enable the counter 410 by the control signal, so as to cause the setting value generating circuit 150 to again generate a counter value according to the working clock and the packet indication signal, and to update the setting value according to the counter value. Next, the frequency synthesis circuit 140 adjusts the working clock according to the new setting value (steps S260 to S280). The frequency offset detection circuit 160 may be implemented by, for example but not limited to, a clock data recovery (CDR) oversampling circuit.

It should be noted that, preferably, while the setting value generating circuit 150 generates the setting value according to the packet indication signal and the working clock (steps S260 and S270), the frequency offset detection circuit 160 does not detect the frequency offset of the working clock (step S290). In contrast, while the frequency offset detection circuit 160 detects the frequency offset of the working clock (step S290), the setting value generating circuit 150 does not generate the setting value (steps S260 and S270).

In the USB2.0 specification, a USB host transmits a start of frame (SOF) packet among data signals Data. Further, according to USB2.0 specifications, the precision of the frequency at which the packet occurs has a limitation of ±500 ppm. When the above control circuit 100 is applied to a USB device, the periodic packet detection circuit 110 detects the SOF packet in the data signal Data. The SOF packet exists at a starting point of each frame, and has a cycle of 125 μs, and an ideal cycle of the working clock is 2.083 ns (corresponding to the USB2.0 operating frequency of 480 MHz). Thus, the foregoing predetermined value is approximately 125000/2.083=60010. When the counter value is smaller than 60010, the setting value generating circuit 150 increases the setting value (i.e., the input value of the frequency dividing circuit of the frequency synthesis circuit 140), such that the divisor for the frequency dividing circuit of the frequency synthesis circuit 140 is increased to increase the frequency of the working clock. Conversely, when the counter value is smaller than 60010, the setting value generating circuit 150 decreases the setting value, such that the divisor of the frequency dividing circuit of the frequency synthesis circuit 140 is reduced to lower the frequency of the working clock. Since a plurality of data are present between two consecutive SOF packets, i.e., the frequency of the data signal Data in USB transmission is higher than the frequency of the SOF packet, oversampling the data by the frequency offset detection circuit 160 may in real-time detect whether the working clock is shifted. Once the frequency offset detection circuit 160 discovers that the working clock is shifted, it immediately informs the setting value generating circuit 150 to count according to subsequent SOF packets and update the setting value.

One person skilled in the art can understand implementation details and variations based on the disclosure of the devices in FIG. 1, FIG. 3 and FIG. 5. While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control circuit of a communication device, comprising:
   a periodic packet detection circuit, detecting a periodic packet of a data signal to generate a packet indication signal corresponding to the periodic packet;
   a frequency synthesis circuit, coupled to the periodic packet detection circuit, generating a working clock according to a reference clock; and
   a setting value generating circuit, coupled to the periodic packet detection circuit and the frequency synthesis circuit, generating a setting value according to a relationship between frequencies of the working clock and the packet indication signal;
   wherein, the frequency synthesis circuit further adjusts the working clock according to the setting value, such that the frequency of the working clock is substantially a predetermined multiple of the frequency of the packet indication signal.

2. The control circuit according to claim 1, wherein the frequency of the packet indication signal is a frequency at which the periodic packet occurs in the data signal.

3. The control circuit according to claim 1, wherein the setting value generating circuit comprises:

a counter, coupled to the periodic packet detection circuit and the frequency synthesis circuit, generating a counter value according to the packet indication signal and the working clock; and a decision circuit, coupled to the counter, generating the setting value according to the counter value and the predetermined multiple.

4. The control circuit according to claim 1, further comprising:

a candidate value generating circuit, selecting one of a plurality of candidate values;

wherein, the frequency synthesis circuit generates a candidate clock according to the selected candidate value, and the periodic packet detection circuit detects the periodic packet according to the candidate clock.

5. The control circuit according to claim 4, further comprising:

a determination circuit, coupled to the periodic packet detection circuit and the candidate value generating circuit, determining an initial value from the candidate values according to the packet indication signal;

wherein, the frequency synthesis circuit generates the working clock according to the initial value and the reference clock.

6. The control circuit according to claim 1, further comprising:

a frequency offset detection circuit, coupled to the setting value generating circuit, detecting a value of a frequency offset of the working clock to determine whether to instruct the setting value generating circuit to update the setting value.

7. The control circuit according to claim 6, wherein while the frequency offset detection circuit detects the value of the frequency offset of the working clock, the setting value generating circuit suspends generating the setting value; while the setting value generating circuit generates the setting value, the frequency offset detection circuit suspends detecting the value of the frequency offset of the working clock.

8. The control circuit according to claim 1, applied to a USB device, wherein the periodic packet detection detects a start of frame (SOF) packet of the data signal to generate the packet indication signal.

9. A control method of a communication device, comprising:

detecting a periodic packet of a data signal to generate a packet indication signal corresponding to the periodic packet;

generating a working clock according to a reference clock; and adjusting the working clock according to a relationship between frequencies of the working clock and the packet indication signal, such that the frequency of the working clock is substantially a predetermined multiple of the frequency of the packet indication signal.

10. The control method according to claim 9, wherein the frequency of the packet indication signal is a frequency at which the periodic packet occurs in the data signal.

11. The control method according to claim 9, wherein the step of adjusting the working clock according to the relationship between the frequencies of the working clock and the packet indication signal comprises:

generating a counter value according to the packet indication signal and the working clock;

generating a setting value according to the counter value and the predetermined multiple; and adjusting the working clock according to the setting value.

12. The control method according to claim 9, further comprising:

selecting one of a plurality of candidate values, and generating a candidate clock according to the selected candidate value and the reference clock;

wherein, the step of detecting the periodic packet of the data signal is performed according to the candidate clock.

13. The control method according to claim 12, further comprising:

determining an initial value from the candidate values according to the packet indication signal;

wherein, the working clock is generated according to the initial value and the reference clock.

14. The control method according to claim 9, further comprising:

detecting a value of a frequency offset of the working clock to determine whether to again adjust the working clock.

15. The control method according to claim 9, further comprising:

suspending generating the setting value while the value of the frequency offset of the working clock is detected; and suspending detecting the value of the frequency offset of the working clock while the setting value is generated.

16. The control method according to claim 9, applied to a USB device, wherein the step of detecting the periodic packet of the data signal detects a start of frame (SOF) packet of the data signal.

* * * * *